July 17, 1951
G. J. PALMER, JR
2,560,737
DEFECTIVELY LABELED AND NONLABELED
CAN DETECTING AND REJECTING DEVICE
Filed Aug. 12, 1947
5 Sheets-Sheet 3
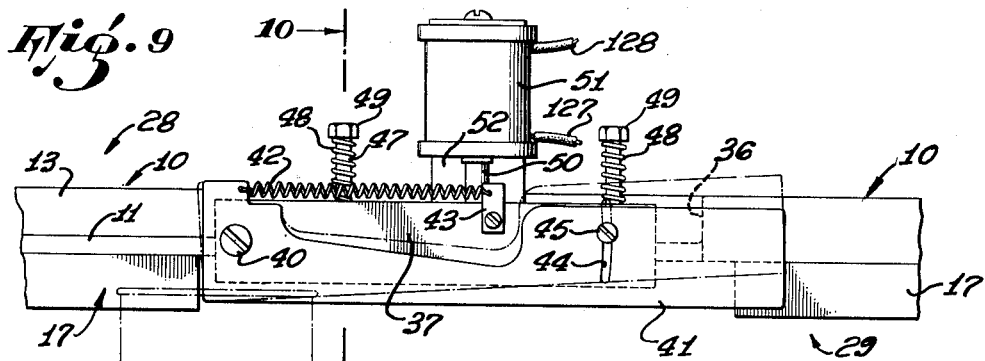
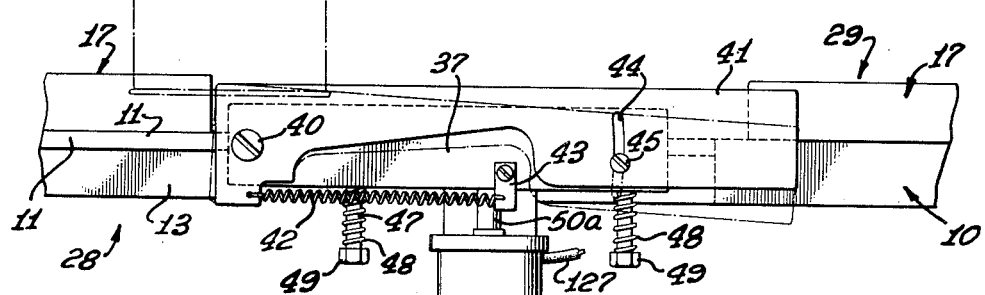
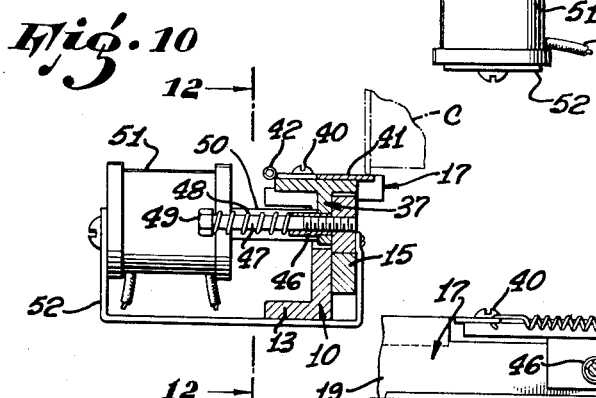
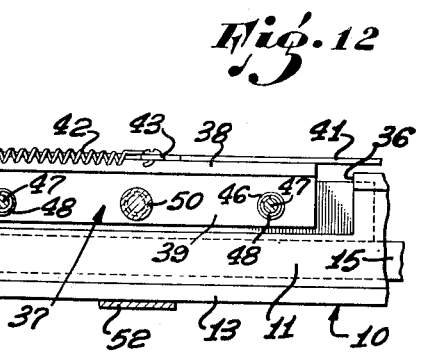
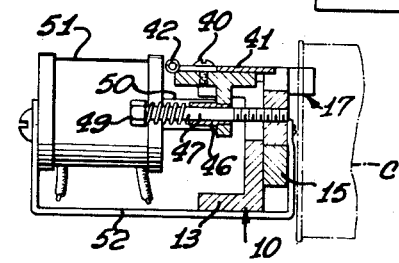
Inventor
George J. Palmer Jr.,
By
Attorney

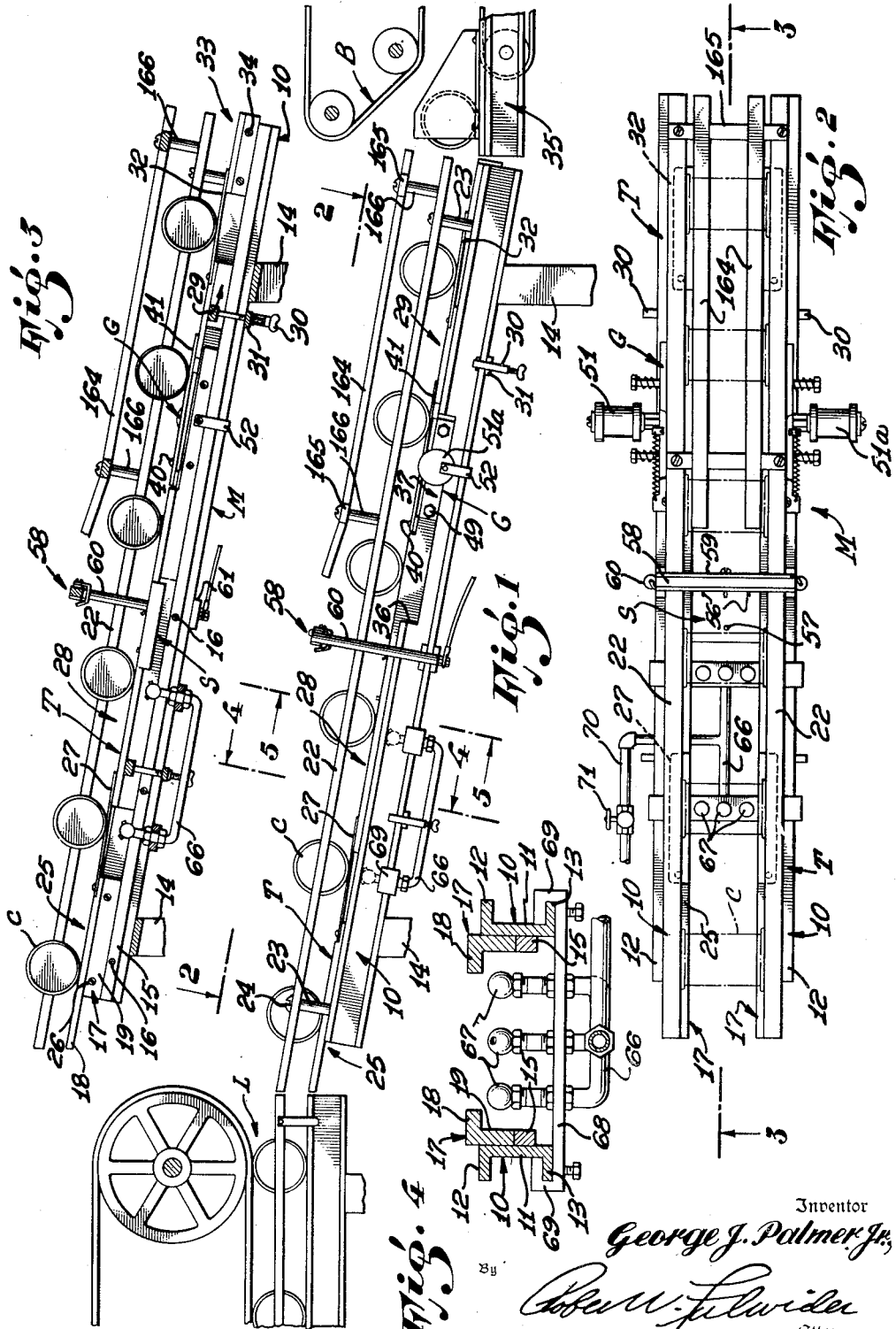

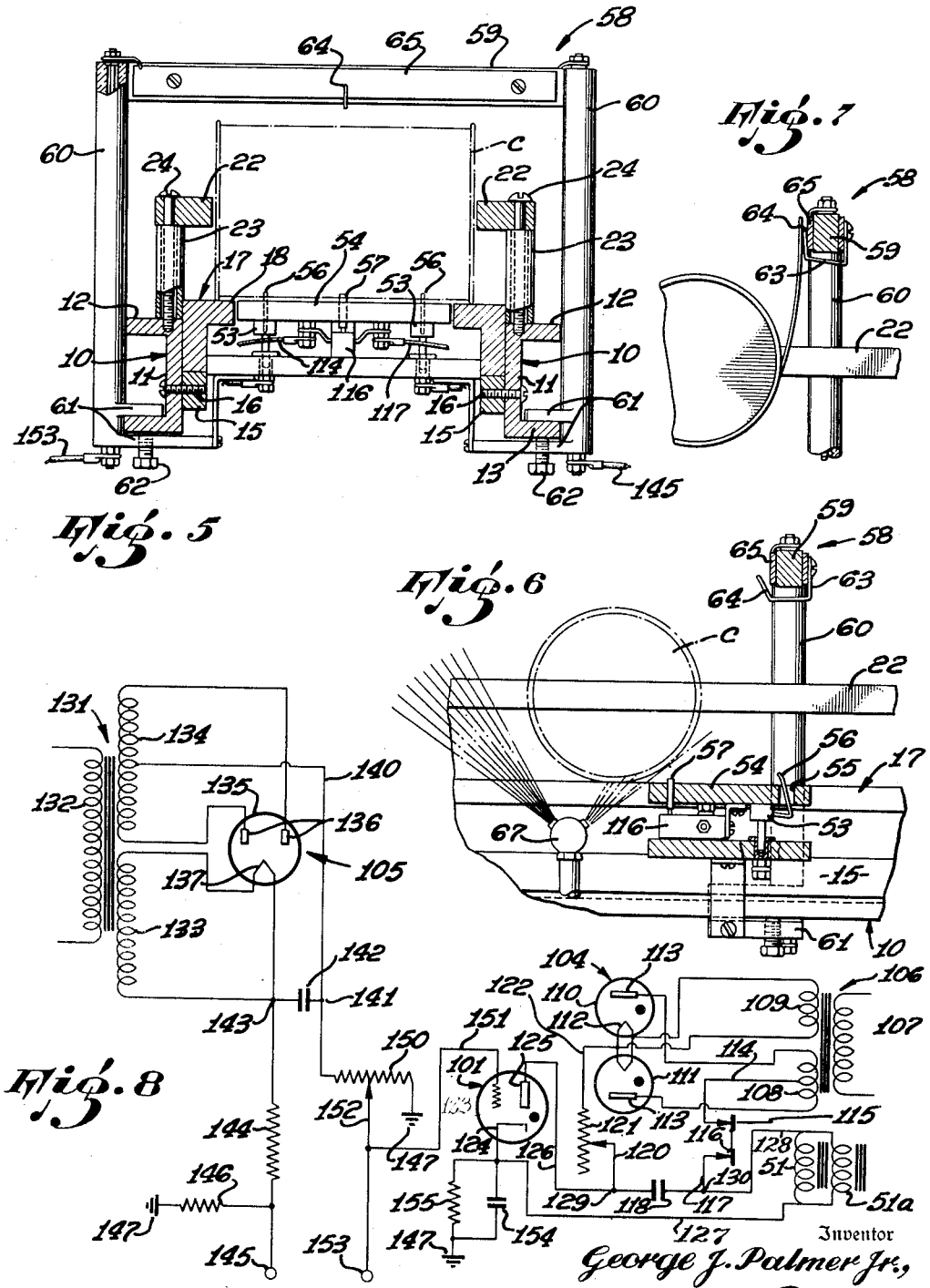

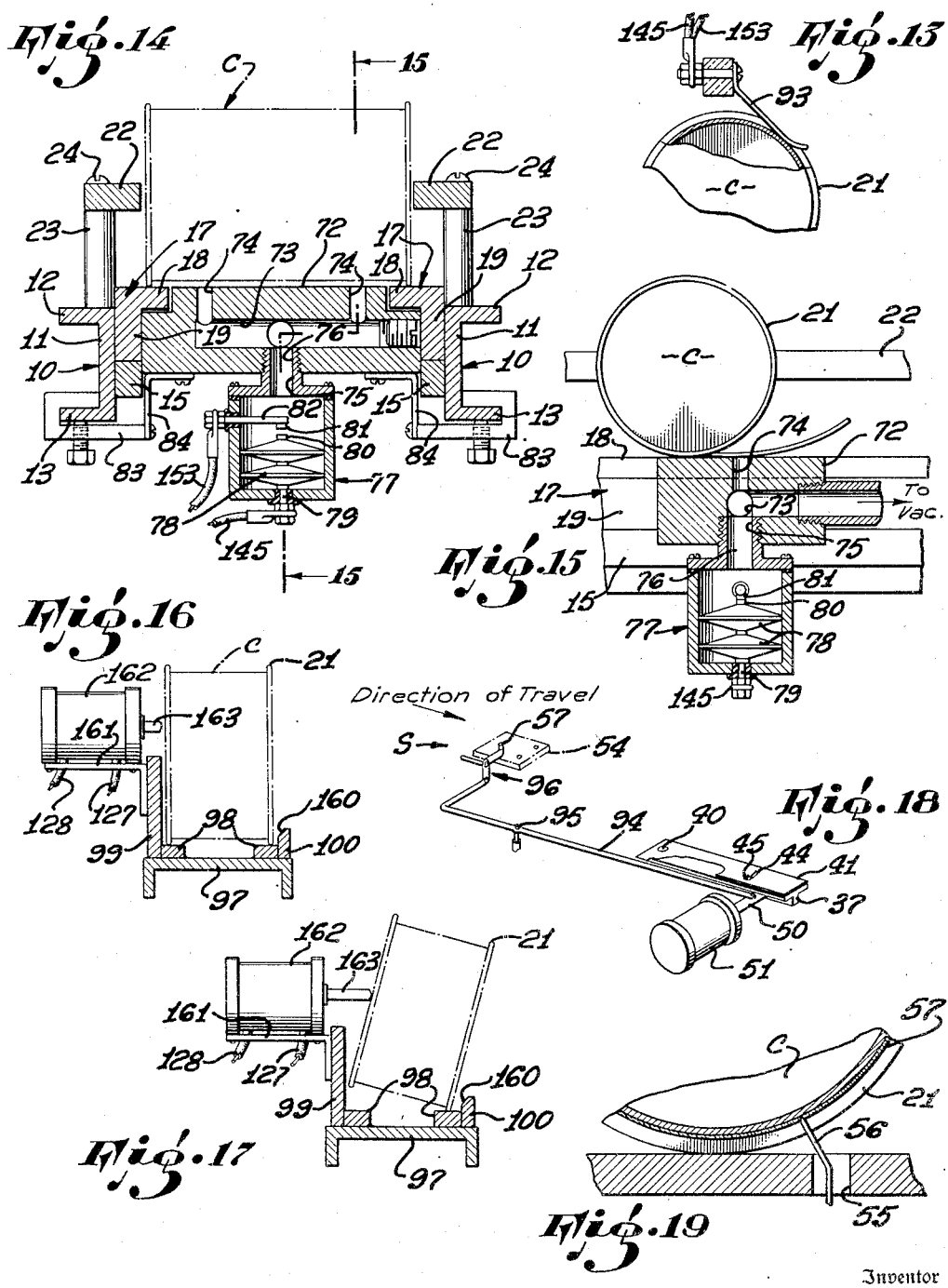

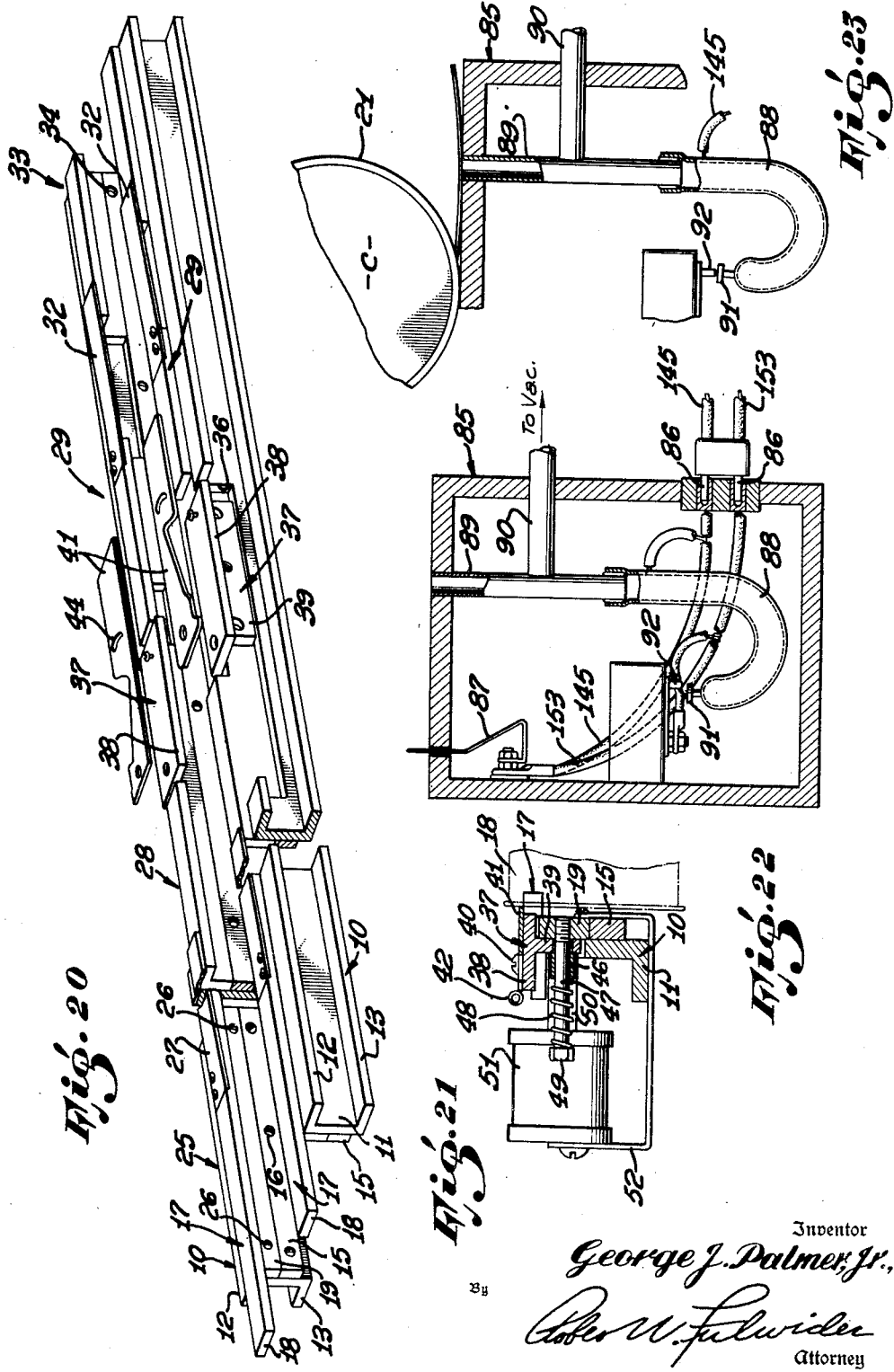

Patented July 17, 1951

2,560,737

UNITED STATES PATENT OFFICE 2,560,737

DEFECTIVELY LABELED AND NONLABELED CAN DETECTING AND REJECTING DEVICE

George J. Palmer, Jr., Long Beach, Calif.

Application August 12, 1947, Serial No. 768,114

12 Claims. (Cl. 209—72)

My invention relates to the field of canning machinery, and more particularly to a device for automatically detecting and rejecting cylindrical containers or cans coming from a labeling machine that are either non-labeled or defectively labeled.

In the manufacture of food products, packaged in the conventional cylindrical metallic container, the container after passing through the canning process is normally routed to a labeling machine adapted to place a glued label thereon. Upon the labeling being completed, the containers are moved by a conveyor system to the packing area where they are placed in suitable shipping cases for delivery to either wholesale or retail markets. However, it frequently happens that the glued labels fail to remain affixed to the cans, or only partly so, which results in the necessity of removing such cans from their packing case prior to the case being sold.

It is for the purpose of eliminating the disadvantages of presently available labeling machines that I have devised my present invention which automatically detects and rejects defectively labeled or non-labeled metallic cans or containers prior to their being placed in cases for shipment. Although such an operation can be performed manually, it has been found from experience that the percentage of human error in selecting defectively labeled cans is quite high due to their rapid movement in leaving the labeling machine.

A primary object of my invention is to provide a mechanism adapted to be used with high speed labeling and conveyor equipment, which will automatically detect and sort out non-labeled or loose labeled cans prior to their being transported to the shipping department.

Another object of my invention is to furnish a compact device that can be installed in connection with presently existing labeling machines without disturbing a large portion of the equipment, that will have a relatively simple mechanical structure, will require a minimum of maintenance attention, and will operate in such a rapid manner that it can handle the output from the fastest of the high speed labelers.

These and other objects and advantages of my invention will become apparent from the following description of a preferred form and certain modifications thereof, and from the drawings illustrating those forms in which:

Fig. 1 is a side elevational view of my mechanism for detecting and rejecting cylindrical cans or containers coming from a labeling machine that are either non-labeled or defectively labeled;

Fig. 2 is a plan view of the device taken on the line 2—2 of Fig. 1;

Fig. 3 is a vertical cross-sectional view of the device taken on the line 3—3 of Fig. 2;

Fig. 4 is a vertical cross-sectional view of the air jets used in blowing loose labels taken on the line 4—4 in Fig. 1;

Fig. 5 is a vertical cross-sectional view of the device showing a can passing over the electric switch used in detecting a non-labeled or loose labeled can taken on the line 5—5 of Fig. 1;

Fig. 6 is a fragmentary side elevational view showing a can prior to rolling over the non-labeled can detecting switch;

Fig. 7 is a fragmentary side elevational view showing the electric detecting switch which is adapted for being actuated by the loose label on a rotating can;

Fig. 8 is a schematic wiring diagram of the electric equipment used in operating the gate which rejects loose labeled or non-labeled cans;

Fig. 9 is a plan view of the solenoid operated non-labeled and defectively labeled can rejecting gate;

Fig. 10 is a fragmentary vertical cross-sectional view showing one side of the can rejecting gate in the closed position;

Fig. 11 is a fragmentary vertical cross-sectional view showing one side of the can rejecting gate in the open position;

Fig. 12 is a side elevational view of the can rejecting gate;

Fig. 13 is a side elevational view of a modified form of non-labeled metallic can detecting contact;

Fig. 14 is a vertical cross-sectional view of a modified form of electric switch for detecting cans having loose labels and which is vacuum operated;

Fig. 15 is a vertical cross-sectional view of the vacuum operated loose label detecting switch taken on the line 15—15 in Fig. 14;

Fig. 16 is a vertical cross-sectional view of a modified form of non-labeled and loose labeled can detecting and rejecting mechanism particularly adapted for use with flat cylindrical cans;

Fig. 17 is another vertical cross-sectional view of the modified form of my device in the process of ejecting a defectively labeled can;

Fig. 18 is a schematic arrangement of an electric switch that is in an actuating position only when the can rejecting gate is in the open position;

Fig. 19 is a fragmentary vertical cross-sectional view of an electric contact pin which is adapted to being used on non-labeled metallic cans which have an external coating of lacquer that is an electrical non-conductor.

Fig. 20 is a perspective view of the rail portion of the preferred form of my device;

Fig. 21 is a fragmentary vertical cross-sectional view showing one side of the can rejecting gate in the closed position with a can passing downwardly therethrough;

Fig. 22 is a vertical cross-sectional view of a combined vacuum operated loosely labeled and bare metallic can detecting switch; and, Fig. 23 is a fragmentary vertical cross-sectional and elevational view of the device being actuated by the loose label on a can.

Referring now to Fig. 1 for the general arrangement of my inventon, it will be seen that situated between a conventional labeling machine L which is adapted to handle cans C of a cylindrical design, and a conveyor belt B that is adapted to remove cans to the shipping area, is my non-labeled and loose labeled can detecting and rejecting mechanism M. It will be noted that the mechanism M includes a downwardly inclined track T which has an electric switch S centrally positioned thereon that actuates a rejecting gate G when a non-labeled or loosely labeled can C comes in contact with the switch.

The detailed structure of the track T over which the cans C roll downwardly by gravity from the rearward end of the labeling machine L is best seen in Figs. 1, 2, 3, and 20, and includes a pair of laterally spaced, parallel, rearwardly and downwardly inclined side members 10. Each of the side members 10, as shown in Figs. 4 and 5, may be formed from commercially available angle iron which is disposed with a web 11 vertically positioned, and upper and lower flanges 12 and 13 respectively, extending outwardly therefrom. Affixed to each of the lower flanges 13 are two supporting legs 14 of unequal height, as best seen in Fig. 1, that by suitable cross-bracing (not shown) hold the track T together as an integral unit.

Situated on the interior face of each of the flange webs 11 slightly above the lower flange 13 is a longitudinally extending guide bar 15 of rectangular cross-section which is held in place by a number of screws 16. A rail 17 having an inverted L-shaped cross-section formed with a horizontal inwardly extending flange 18 on which one of the ends of the can C rolls, and a vertical flange 19 the lower edge of which rests upon the upper face of the guide bar 15 is provided for each of the side members 10.

For guiding the cans C after they leave the labeling machine L and roll along the upper surface of the flanges 18 on their outwardly extending rims 21, a pair of laterally spaced longitudinally extending rigid strips 22 is provided as best seen in Fig. 5. Each of the strips 22 is supported on the upper end of a number of cylindrical members 23 that are mounted in a vertical position on the upper surface of the flange 12, with each of the members being held in position thereon by a downwardly extending screw 24. The guide strips 22 are each provided with slotted openings through which the screws 24 pass, and thus the strips can be laterally adjusted with relation to one another so that only sufficient space exists therebetween for a can C of a particular size to roll. It will be apparent that due to the small space existing between the ends of the cans C and the interior faces of the guide rails 22 that there will be no tendency for the cans to turn and bind therebetween.

It will be noted in Figs. 3 and 20 that while the rails 17 permit the cans C to roll from the labeling machine L to the conveyor belt B that they are not continuous members, but are made up of a number of component sections. A fixed rail section 25 is situated on the forward end of the track T adjacent to the labeling machine L, and is attached to the interior faces of the side members 10 by a number of screws 26. Proceeding forwardly from the section 25 are extensions of the flanges 18 that are used in making a smooth transition for the cans C in rolling from the labeling machine L to the track T. Supported from the rearward portion of each of the flanges 18 in the section 25 is an overhanging, rectangular, spring steel blade 27 that has its upper surface flush and its inner edge in alignment with the flange. Upon the cans C rolling over the section 25 and the pair of blades 27, they pass to a section 28 that contains the switch S and the can rejecting gate G, and which is slidably movable on the pair of guides 15 as will hereinafter be explained.

The perfectly labeled cans C after having traversed the section 28 roll on to a longitudinally adjustable section 29 that is formed from a pair of rails 17. Each of the rails 17 is slidably mounted on the upper face of one of the guides 15, and is rigidly connected to the opposite rail by a suitable cross member (not shown) that is located toward their rearward end. By horizontal movement of the sections 28 and 29 not only can the longitudinal length of the opening in the gate G be regulated in accordance with the trajectory which the rejected cans will have in passing therethrough, but the section 28 can be placed in a position in which the switch S situated thereon is properly contacted by the paste joint on the label of each can as its passes thereover. Thus as each can C is uniformly labeled by the labeling machine L and makes the same number of revolutions in traveling along the track T it is a simple matter to locate the section 28 in a position in which the switch S is contacted by the paste joint on each labeled can. As each loosely labeled can is detected by the switch S being contacted by a bare portion of the exterior surface thereof, and as a loosely labeled can will have such a bare surface at the paste joint of the label, it will be apparent that the proper horizontal adjustment of the section 28 so that the switch S contacts the paste joint of each labeled can is highly important. It will be noted in Fig. 3 that the forward portion of the section 29 and the rearward portion of the section 28 are adapted to dovetail together which will permit the opening in the gate G to be held to a minimum when the cans C are being run over the track T at a relatively low speed. To hold the section 29 in the desired position, a C-clamp 30 of conventional design is provided that engages a cross bar 31 which is affixed to the section and the flange 13 as can best be seen in Figs. 1 and 3. Two thin rectangular blades 32 extend rearwardly from the section 29, and permit the cans C to roll on to a fixed rail section 33 that is secured to the interior faces of the side members 10 by several screws 34. From the section 33 the cans C pass to the support 35 of the conveyor belt B where they are transferred to the crating and shipping area.

To eliminate those cans C coming from the labeling machine that may be non-labeled or loosely labeled from the stream of perfectly labeled cans rolling over the section 28, the defectively labeled can rejecting gate G is located on the rearward portion of the section. The construction of the gate G, as best seen in Figs. 20 and 21, includes the formation of a slot 36 in the upper portion of each of the side members 10 at substantially its mid point. Partially replacing the removed portion of each of the side members 10 is a member 37 of T-shaped cross-section that is situated on the rearward portion of each of the rails 17 in the section 28. Thus a gate portion is formed in the section 28 that permits the forward part of the section which is composed of the rails 17 to be longitudinally adjustable upon the guide bars 15, but with this adjustment restricted to the amount of longitudinal movement which the members 37 can make within the confines of the slots 36.

In Fig. 21, it will be seen that each of the members 37 is formed from a horizontal flange 38 which does not extend in sufficiently far to support one of the ends of the can C, and a vertical flange 39 that is longitudinally movable within the limits of the slot 36. Pivotally mounted upon the upper surface of each of the flanges 38 upon a vertically positioned machine screw 40 that is affixed thereto is a thin rectangular blade 41 that extends rearwardly over the section 29, with the inner portion of the blade overhanging the inner edge of the flange 38 to provide a rolling surface for one end of the cans C when the gate G is in the closed position as shown in Fig. 10. Each of the blades 41 as can be seen in Fig. 9 tends to be rotated inwardly at all times by a helical spring 42 that is affixed on one end to the forward portion of the blade, and on the opposite end to an arm 43 which is mounted on the upper surface of the flange 38. However, due to a slot 44 that is formed in the rearward portion of each of the blades 41 and which engages a machine screw 45 that is vertically supported from the flange 38, the movement of the blade is restricted to a position in which its inner edge is parallel with that of the flange 18.

In Fig. 21 it will be seen that should one of the cans C be ejected with the gate G in the open position, and the gate close before the can has completely fallen therethrough, the blades 41 will be pivoted outwardly by the can to permit the continuation of its downward movement. Upon the can having passed through the gate G, the springs 42 will rotate the blades 41 inwardly to the closed position shown in Figs. 9 and 10. The position of the blades 41 with the gate G in the closed position is also shown in phantom line in Fig. 9.

The gate G is adapted to be opened by providing each of the flanges 39 with a pair of laterally spaced brass bushings 46, each of which is slidably mounted on a substantially horizontal bolt 47 that is supported from the outer face of the flange 19. A helical spring 48 encircles each of the bolts 47 between its head 49 and the outer surface of the bushing 46, and as the springs are in compression the gate G will tend to remain in the closed position at all times.

To open the gate G when a defectively labeled can C actuates the switch S, the gate members 37 are provided with outwardly extending horizontal iron or steel plungers 50 and 50a that are each slidably mounted in conventional electrically operated solenoids 51 and 51a respectively. Each of the solenoids 51 and 51a is supported in a horizontal position from the outer veritcal arm of a U-shaped bracket 52 which is affixed by the opposite vertical arm to the inner face of the flange 19 of the section 28. Upon the solenoids 51 and 51a being electrically energized the gate portions 37 are moved outwardly into the position shown in Fig. 11, but due to the compression of the helical springs 48, they are immediately returned to their normally closed position upon the solenoids being de-energized.

The switch S that causes the electrical energization of the solenoids 51 and 51a due to a defectively labeled can C being contacted is formed from three distinct switches that will here be briefly described and later described in more detail in connection with the solenoid actuating electric circuit shown in diagramatic form in Fig. 8.

A switch 53 that is used in detecting the passage of a bare metallic can C thereover is formed from a rectangular base 54 of an electrical insulating material as best seen in Figs. 5 and 6 which is supported between the inner edges of the flanges 18 in a conventional manner. The base 54 is provided with a pair of laterally spaced vertical bores 55 through each of which projects upwardly a resiliently mounted, vertically movable pin 56 that is included in an electric circuit as will hereinafter be described. Thus as the cans C roll over the switch 53, the pins 56 are contacted, and in the event the can is non-labeled, an electric circuit is momentarily completed between the pins due to the electrical conductivity of the side walls of the can. This completion of an electric circuit between the pins 56 is sufficient to cause the solenoids 51 and 51a to be energized, and to be held in this condition until the circuit is broken by the action of a later to be described snap switch. It will of course be obvious that when a properly labeled can C rolls over the contact pins 56 that the paper label thereon acts as an insulator and no electric circuit is completed between the pins to energize the solenoids 51 and 51a and open the gate G.

Should it be found desirable to use cans C with my device that are coated with a lacquer enamel 20 which is an electrical non-conductor, a modification of the pins 56 such as is shown in Fig. 19 can be employed. The upper portion of each of the pins 56 is merely bent forwardly, and the end portion of each is furnished with a sharp point that will pierce the enamel to establish contact with the metallic side wall existing thereunder, whereupon an electric circuit will be established between the pins as previously described.

Due to the circuit used in energizing the solenoids 51 and 51a electric energy will continue to flow to the solenoids to hold the gate G open until a conventional snap switch 116 that is normally closed is momentarily placed in the open position. The switch 116 is located forwardly from the pins 56 on the track T, and is provided with a vertically movable actuating pin 57. Thus in the operation of my device each can in passing over the pin 57 breaks an electric circuit which causes the gate G to close, even though the can may be non-labeled, and will place the gate G in the open position upon contacting the pins 56.

The third switch 58 which is best seen in Figs. 5, 6, and 7 is used for detecting loose labels on a can C and is situated on a horizontally positioned cross bar 59 that extends across the rails 17 at a slightly higher elevation than the upper limits of the can C when it is rolling along the flanges 18. Supporting the cross bar 59 on each end is a vertical insulator rod 60 that is furnished on its lower extremity with a pair of spaced parallel arms 61 that engage the lower side member flange 13, and is held thereon by a thumb screw or machine bolt 62. The switch 58 is formed from a resilient U-shaped member having a rearwardly disposed vertical arm 63 that is affixed to the cross bar 59 by a screw, and a slightly forwardly inclined vertical arm 64 that is adapted to be bent rearwardly by a loose label to contact a metal plate 65. Thus by the use of wiring which will hereinafter be described in detail either the pins 56 upon being contacted by a non-labeled metallic can C, or the switch 58 upon being brushed with a loose label will cause the solenoids 51 and 51a to be electrically energized to open the gate G.

To insure that any loose label on a can C will contact the switch 58, a pair of laterally spaced, parallel, air pipes 66 extend under the track T between the rails 17. Each of the pipes 66 as can be seen in Figs. 3 and 4 is provided with three upwardly extending air jets 67 which direct a blast of air both forwardly and rearwardly along the track T. The pipes 66 are supported from a cross bar 68 that is supplied on each end with a C-clamp 69 that can be attached to the lower side member flange 13. Thus the air jets 67 are longitudinally adjustable along the track T and can be located in a position where a blast of air will strike the paste joint of a label on a can C when the joint is at its lowest position. Should the label be loosely held at the paste joint, it will be blown upwardly by the blast of air into a position as shown in Fig. 7, and will be so maintained by the balance of the air jets until the label contacts the switch 58. Both of the air pipes 66 are connected to a common factory supply line 70 that is provided with a conveniently located shut off valve 71 that is placed in the closed position when my device is not being used.

In Fig. 8, I have indicated a schematic wiring diagram illustrating the various electrical components used for attaining a rapidly operating gate G that will open to drop a non-labeled or loose labeled can C therethrough, and be closed by the following can as it contacts the pin 57 on the snap switch 116. Broadly, the circuit includes a thyratron 101 or other suitable type of gaseous electron discharge tube which is adapted to control the flow of electricity through the solenoid electro-magnets 51 and 51a to operate the gate members 37 of my device. The power controlled by the thyratron 101 is furnished by a rectifier circuit indicated generally by the numeral 104, while the power which controls the operation of the thyratron is furnished by a second rectifier circuit indicated generally by the numeral 105.

Considering first the rectifier circuit 104 which supplies the power for the solenoids 51 and 51a, it will be seen that this circuit includes a power transformer 106 having a primary winding 107 connected to a suitable source of alternating current (not shown), a high voltage center-tapped winding 108, and a low voltage secondary winding 109. A pair of electron discharge tubes 110 and 111, preferably of the gaseous-filled diode type such as 866, are each provided with a cathode 112 and an anode or plate 113, the cathode being connected in parallel to the terminals of the low voltage secondary winding 109 for energization thereby. The anodes 113 of the tube 110 and 111 are connected to the end terminals of the high voltage secondary winding 108, and the center tap of the secondary 108 is connected through a conductor 114 to a pair of switches 115 and 116, hereinafter described in greater detail, and then through a conductor 117 to one terminal of a capacitor 118. The opposite terminal of the capacitor 118 is connected through a conductor 120 to a variable resistor 121 and conductor 122 to the cathodes 112. In this way, the output of the rectifier circuit is applied to the capacitor 118, thereby charging the latter, with the charge time being controlled by the variable resistor 121.

Connected in parallel with the capacitor 118 is a series circuit including the solenoids 51 and 51a and the output circuit of the gaseous discharge tube 101. This tube, as previously mentioned, is preferably of the thyratron type, and as is conventional in such tubes, includes a control element or grid 123, a cathode 124, and a plate or anode 125. While other types of tubes may be used for this purpose, I have found a type commercially available under the designation WL632A is very satisfactory.

As indicated in the wiring diagram, the plate 125 of the tube 101 is connected by a conductor 126 to the previously mentioned conductor 120 at a junction point 129, and the cathode 124 of the tube is connected by a conductor 127 to one terminal of each of the solenoids 51 and 51a. The other terminals of these solenoids are connected by a conductor 128 to the previously mentioned conductor 117 at a junction point 130. In this way, the power of the rectifier circuit 104 appearing at the junction points 129 and 130 is applied to the output circuit of the tube 101, and this circuit may be traced from junction point 129 through conductor 126 to plate 125, from cathode 124, through conductor 127 and solenoids 51 and 51a, through conductor 128 to junction point 130. The capacitor 118 is connected directly between the junction points 129 and 130, and is thereby charged to the potential appearing between these junction points when the tube 101 is non-conductive. When the tube 101 is rendered conductive by the operation of the control element or grid 123, the power stored in the capacitor 118 will be discharged through the tube, passing through the latter and the solenoids 51 and 51a. In addition, the power output from the rectifier circuit 104 will additionally flow through the tube 101 and the solenoids 51 and 51a to maintain the latter in an energized condition. It will be appreciated that the switches 115 and 116 will be closed when this occurs, the switch 115 being a manually operated control switch on the panel of the instrument, while the switch 116 is positioned forwardly from the pair of pins 56 on the track T and is operated by cans coming in contact with its actuating pin 57.

It will be realized that in order for the tube 101 to act in its normal manner to control the passage of current through solenoids 51 and 51a, the grid 123 of the tube must be maintained at a negative potential with respect to the cathode 124 in order to prevent the establishment of a current flow between the cathode and the anode 125. When the grid 123 is driven to a positive potential with respect to the cathode 124, the tube 101 is rendered conductive and the current flows between the cathode 124 and the plate 125. As is well known, once the tube 101 is rendered conductive, the grid 123 has no further control until such time as the plate 125 has its voltage decreased to a point where the conduction of the tube ceases. In order to provide the necessary control for the grid 123, I have developed a circuit now to be described and powered by the rectifier circuit 105.

While a self-biasing circuit for the grid 123 may sometimes be employed, I have found it preferable to use a separate power source to supply the voltage to the grid 123, since in this manner I am able to secure more dependable operation. As indicated, the rectifier circuit 105 includes a transformer 131 having a primary winding 132 connected to a suitable source of alternating current (not shown) and having a low voltage secondary winding 133, and a center tapped high voltage secondary winding 134. An electron discharge tube 135, preferably of the full-wave type such as the commercially designated type 80, having a pair of plates or anodes 136 and a cathode 137, has its cathode connected to the terminals of the low voltage secondary winding 133, and its anode 136 connected to the end terminals of the high voltage windings 134. The center tap of the high voltage winding 134 is connected by a conductor 140 to a junction point 141, and one terminal of a capacitor 142 is connected to this junction point, the other terminal thereof being connected at junction point 143 to the cathode 137. It will be appreciated that this is a conventional rectifier circuit, in which the capacitor 142 is connected across the output terminals 141 and 143 to provide a smoother output voltage.

Under these conditions, it will be realized that the junction point 143 is positive with respect to the junction point 141, and this voltage or a portion thereof may be used to control the operation of the grid 123 or tube 101. To do this, I connect a resistor 144 in series between the junction point 143 and a terminal 145, the latter also being connected through a resistor 146 to a ground or common connection 147. A potentiometer 150 has one of its end terminals connected to the junction point 141, while the other terminal is connected to the ground or common connection 147. The grid 123 of tube 101 is connected by a conductor 151 to the wiper or sliding contact 152 of the potentiometer 150, the wiper also being connected to a terminal 153. Cathode 124 of the tube 101 is connected through a capacitor 154 to the common connection or ground 147, and the capacitor is shunted by a fixed resistor 155, as is customary in the art.

The input circuit of the tube 101 may now be traced. Assuming that terminals 145 and 153 are not short-circuited, the input circuit may be traced from junction point 143, through resistors 144 and 146 to ground 147, through resistor 155 and capacitor 154 to cathode 124, and from grid 123, through conductor 151 and a portion of the resistor 150 of the potentiometer to junction point 141. By the proper selection of the values for the resistors 144, 146, 150 and 155, the grid 123 will be negative with respect to cathode 124 under these conditions. However, when terminals 145 and 153 are connected together, as by a switch, the relationship of the various elements is considerably modified and the grid 123 will become positive with respect to cathode 124.

If the terminals 145 and 153 are connected to the pins 56 so that they will be shorted when a non-labeled can passes thereby, and if the terminals are also connected to switch 58 so that a loose label will close the circuit between the terminals, as indicated in Fig. 7, a non-labeled can or one with a loose label will operate the circuit to drive the grid 123 positive with respect to the cathode 124.

As previously mentioned, when the grid 123 is driven positive, the tube 101 is rendered conductive and the solenoids 51 and 51a are energized to operate the gate members 37. The capacitor 118 aids in this by providing the full voltage of the rectifier circuit 104 when the solenoids 51 and 51a are first energized, thereby assuring the very rapid operation of the gates 37. However, once the gates have been operated to reject non-labeled or loose labeled cans, they must immediately be closed in order that following cans will not be ejected unless they too are non-labeled or loose labeled. This requires that the solenoids 51 and 51a be deenergized by the time that the succeeding can reaches the gate G, but the grid 123, as controlled by the closing of the circuit between the terminals 145 and 153, is no longer capable of affecting the operation of the tube 101. The tube may be rendered non-conductive only by decreasing the current through the output circuit of the tube 101 to a point where the grid 123 regains control, and consequently, I have provided the snap-action switch 116 previously mentioned. The switch is of the normally closed type, which is actuated to open the circuit between the center tap of the secondary winding 108 of transformer 106, and junction point 117 whenever a can passes over the operating pin 57 of the switch. The power supply circuit for the tube 101 is thus momentarily broken, and the grid 123 thus regains control. If the label is properly affixed to the can, the circuit between the terminals 145 and 153 will remain open, thereby retaining the tube 101 in non-conductive condition. Consequently, the solenoids 51 and 51a are not energized, and the can proceeds past the gates, along its normal path. Each time a can passes the operating pin 57 of the switch 116, the latter is opened and whenever the circuit between the terminals 145 and 153 is closed, the tube 101 is rendered conductive and the solenoids 51 and 51a are operated to open the gate portions 37 so that a particular can is shunted or by-passed and will not follow the normal path of the properly labeled cans.

Although I have found the above described form of my invention to operate quite satisfactorily, it will be apparent that certain modifications can be made in its component parts which under some operating conditions will be found advantageous.

In Fig. 14 is shown a rectangular metallic block 72 adapted to be inserted between the rails 17, and by the use of a vacuum may be used to replace the switch 58 that detects loosely labeled cans. A horizontal bore 73 extends inwardly into the block 72 from one side thereof, and is in communication with two upwardly extending bores 74, and a downwardly positioned tapped bore 75. Engaging the bore 75 is a nipple 76 that is formed on the upper portion of an air-tight housing 77 which serves to enclose a pair of aneroid type metallic diaphragms 78. A terminal post 79 electrically insulated from the housing 77 extends downwardly from the diaphragms 78 and is connected to a terminal lug provided on the conductor 145. Situated on the upper diaphragm 78 is a contact point 80, which is adapted when vacuum is applied to the housing 77 to be moved upwardly by the expansion of the diaphragms to engage a contact point 81. The contact point 81 is supported from a horizontal rod 82 that is insulated from the housing 77, and is electrically connected to the conductor 153. Thus it will be seen that with the bore 73 connected to a source of vacuum, a can C having a loose label upon rolling into the position shown in Fig. 15 will momentarily close the bores 74 and decrease the pressure in the housing 77. Upon such a decrease in pressure, the contact point 80 will be moved upwardly by the expansion of the diaphragms 78 to engage the point 81 and complete an electric circuit that actuates the gate G in the same manner as previously described in connection with the switch 58. Although a number of different methods can be employed to hold the block 72 between the rails 17, I prefer to employ a small C-clamp 83 affixed to each of the lower rail flanges 13, the inner end of which supports an L-shaped bracket 84 that is affixed to the lower face of the block 72.

Shown in Figs. 22 and 23 is a completely integrated non-labeled and loosely labeled can detecting unit which is contained in an enclosed box 85 that can be supported between the rails 17 in any conventional manner. It will be noted that the conductors 145 and 153 are provided with jacks 86 that engage suitable inserts situated in the side of the box 85 for convenience in the maintenance of this unit. Each of the conductors 145 and 153 is connected to a resiliently mounted pin 87 that serves to complete an electric circuit between the conductors when a non-labeled metallic can C rolls thereover, and causes the gate G to be opened to eject this can in the same manner as previously described in connection with the switch 53. A thin walled, hollow, metallic J-shaped member 88 is vertically positioned inside the box 85 and has an open tubular portion 89 that extends to the top thereof, and is also provided with a horizontal tube 90 which is connected to a source of vacuum. A contact point 91 is affixed to the upper end of the J-shaped member 88, as best seen in Fig. 23, and is moved upwardly to contact a point 92 when the pressure in member 88 is lowered by the open end of the tube 89 being obstructed by a loose label. Upon this occurring, an electric circuit is completed between the conductors 145 and 153 which are connected to the contact points 91 and 92 respectively.

Fig. 13 illustrates a modification for detecting the passage of a non-labeled can C along the track T by providing a pair of downwardly and rearwardly extending metal contact strips 93 which will be supported from the cross bar 59 and replace the vertically movable pins 56. The method of wiring the strips 93 is identical to that employed with the contact pins 56. It will be apparent that the metal contact strips 93 will not be adapted for use when cans having a lacquer enamel exterior coating are being run.

To lessen the wear on the switch 116, the modified arrangement shown in Fig. 18 can be employed. An elongated L-shaped member 94 is pivotally mounted on a pin 95 with one end of the member being movably connected to one of the solenoid plungers 50 or 50a, and the opposite end to a linkage system 96 that will keep the pin 57 in the retracted position until the gate members 37 move to the open position. At this time, the pin 57 is placed in an elevated position to contact the next can C and de-energize the solenoids 51 and 51a which will allow the gate G to assume the closed position. Upon the gate portion 37 returning to the closed position, the member 94 is rotated to return the pin 57 to the retracted position until the gate G is again opened by the passage of a defectively labeled can over one of the switches S.

In the use of my invention in the packing industry where flat cylindrical cans such as are used for fish products are employed, I have found that the track T can be modified to the form shown in Figs. 16 and 17 and the gate G dispensed with. An inverted channel 97 is preferably used as the base plate for the track T and is furnished on its upper side with a pair of laterally spaced parallel rails 98 upon which the rims 21 of the can C are adapted to rotate. An upright guard rail 99 extends upwardly substantially one half of the diameter of the can C on one side of the channel 97, while a guide rail 100 that extends upwardly above the rails 98 but one-quarter of an inch occupies a similar position on the opposite side of the channel. It will be noted that the guide rail 100 is provided on its inner edge with a bevel 160 to permit cans C to be ejected from this side of the track as will hereinafter be explained.

Supported from the channel 97 by a suitable bracket 161 is a single horizontally positioned solenoid 162 that is wired in the same manner as previously described in connection with the solenoids 51 and 51a, but with the switch 116 so arranged that it will be opened when a plunger 163 that is slidably mounted in the solenoid moves outwardly over the channel 97 a pre-determined distance. The plunger 163 is spring loaded so that it will normally occupy the position shown in Fig. 16 which permits perfectly labeled cans C to pass thereby, but upon a non-labeled or loosely labeled can contacting one of the switches S and electrically energizing the solenoid, the plunger is moved outwardly to deflect the defectively labeled can as illustrated in Fig. 17. Upon the plunger 163 reaching a pre-determined position, the switch 116 is opened to de-energize the solenoid 162 and the plunger, due to being spring loaded, is returned to its normal position until such time as another defectively labeled can C contacts the switch S.

In both this form of my device, as well as in the previously described form, I have found that cans C rotating at a high speed have a tendency to bounce or jump after passing over a switch or other slight obstruction on the track T. To eliminate the possibility of the cans C leaving the track T or causing a jam, I have found it desirable to place longitudinally extending strips 164 over the track T as best seen in Figs. 1 and 3. The strips 164 are supported from spaced crosspieces 165 that are mounted on each end on the upper portion of a vertical upright 166 which is affixed to the upper surface of one of the guide strips 22 in a conventional manner.

While the particular devices herein shown and described in detail are fully capable of attaining the objects and providing the advantages hereinbefore stated, it is to be understood that they are merely illustrative of the presently preferred embodiments of my invention, and that I do not mean to limit myself to the details of construction or design herein shown other than as defined in the appended claims.

I claim:

1. A loosely labeled and non-labeled can detecting and rejecting device which includes: a pair of parallel, laterally spaced, guide rails adapted to support a plurality of rolling cans; an electrically operated gate, formed from an equal portion of each of said rails that is adapted to move outwardly to permit a loosely labeled or non-labeled can to drop therethrough; a blade rotatably mounted on the upper surface of each of said gate portions and allowing said gate to assume its closed position although one of said loosely labeled or non-labeled cans has not fallen completely therethrough; and electronic switching means responsive to both loosely labeled and non-labeled cans adapted to actuate said gate and cause each of said gate portions to move outwardly and eject said loosely labeled or non-labeled can and return to their initial position before the next of said cans will pass thereover.

2. A loosely labeled and non-labeled can detecting and rejecting device which includes: a pair of parallel, laterally spaced guide rails adapted to support a plurality of rolling cans therebetween; an electrically operated gate, formed from an equal portion of each of said rails that is adapted to move outwardly to permit a loosely labeled or non-labeled can to drop therethrough; a pair of spaced contact pins adapted to complete an electrical circuit to said electrically operated gate when said pins are contacted by a metallic non-labeled can; a switch adapted to complete an electrical circuit to said electrically operated gate when contacted by a loose label on a can; an air jet adapted to blow loose labels on said cans into contact with said loose label detecting switch; and a switch adapted to break the electrical circuit to said gate established by said loosely labeled or non-labeled can upon being passed over by the can following said loosely labeled or non-labeled can whereby said spring loaded gate is returned to its closed position prior to being passed over by said following can.

3. A loosely labeled and non-labeled can detecting and rejecting device which includes: guide means adapted to support a plurality of rolling cans; an electrically operated gate positioned in said guide means, said gate when electrically energized being adapted to eject a loosely labeled or non-labeled can; a pair of contact points located adjacent to said guide means and adapted to complete an electrical circuit to said gate when said points are contacted by a metallic non-labeled can; a vacuum operated switch adapted to complete an electrical circuit to said gate when a loosely labeled can passes thereover; and a snap switch adapted to break the electrical circuit to said gate established by either a loosely labeled or non-labeled can when contacted by the can following said loosely labeled or non-labeled can whereby said gate is returned to its normally closed position prior to being passed over by said following can.

4. A loosely labeled and non-labeled can detecting and rejecting device which includes: a pair of parallel, laterally spaced guide rails adapted to support a plurality of rolling cans therebetween; an electrically operated gate, formed from an equal portion of each of said rails, with each of said portions being adapted to move outwardly and permit a can to fall therebetween when said gate is electrically energized; a pair of spaced contact pins adapted to complete an electrical circuit, which includes a gas filled discharge tube, to energize said gate when said contact pins are actuated by a metallic non-labeled can; a vacuum operated switch, provided with aneroid means adapted to complete an electrical circuit to energize said gate when the atmospheric pressure in said switch is momentarily decreased by a loosely labeled can coming into contact with said switch; and a snap switch that is normally in the retracted position except when said gate is in the open can ejecting position, and which when contacted by the can following a loosely labeled or non-labeled can breaks the electrical circuit to said gate and permits it to return to its normally closed position prior to said can passing thereover.

5. A gate adapted to eject loosely labeled or non-labeled cans which includes: a pair of parallel, laterally spaced members; a solenoid adapted to move each of said members outwardly; a blade pivotally mounted on the upper surface of each of said members, with said blade being provided with a slot, an upwardly extending pin affixed to the upper surface of each of said members and adapted to engage said slot whereby said blade will be limited to a predetermined amount of movement; and a spring affixed to each of said blades and said members whereby said blade will be returned to its normal position although said gate may close with a can situated therebetween said members.

6. A loosely labeled can detecting switch which includes: a block provided with an inwardly extending bore and an upwardly and downwardly extending bore intersecting said bore, an air tight housing connected to said downwardly extending bore; an aneroid bellows movably mounted in said housing; an electrical contact point mounted on the upper portion of said bellows; a second electrical contact point mounted above said first contact point whereby when a vacuum is applied to said inwardly extending bore and a loose label on a can momentarily covers said upwardly extending bore the atmospheric pressure in said housing will be decreased causing said bellows to expand and an electrical circuit completed to signal that a loosely labeled can is passing over said switch by said contact points engaging one another.

7. A loosely labeled and non-labeled can detecting and rejecting device which includes: a pair of parallel, laterally spaced, guide rails adapted to support a plurality of rolling cans; a fixed section supported on one end of said guide rails and adapted to abut against a labeling machine to form a smooth transition for cans in rolling therefrom; a second fixed section supported on the opposite end of said guide rails and adapted to effect a transition of said cans to a conveyor; an electrically operated gate longitudinally movable on said guide rails and adapted to permit a can to fall therethrough when said gate is electrically energized; a section longitudinally movable on said guide rails and adapted to cooperate with said gate to regulate the length of the opening that said cans will fall through when said gate is electrically energized; a pair of spaced contact pins adapted to complete an electrical circuit which includes a gas filled discharge tube, to energize said gate when said contact pins are actuated by a metallic non-labeled can; a vacuum operated switch adapted to complete an electrical circuit to energize said gate when the atmospheric pressure in said switch is momentarily decreased by a loosely labeled can coming into contact with said switch; and a snap switch that is normally in the retracted position except when said gate is in the open can ejecting position, and which when contacted by the can following a loosely labeled or non-labeled can breaks the electrical circuit to said gate and permits it to return to its normally closed position prior to said can passing thereover.

8. A loosely labeled and non-labeled metallic can detecting switch which includes: a tubular resilient J-shaped member with the upper end of said member adapted to have cans roll thereover; an electrical contact point mounted on the outer end of said member; a second electrical contact point mounted above said first contact point; a pair of laterally spaced contact pins adapted for vertical movement; means for drawing a stream of air downwardly through the upper end of said J-shaped member; and an insulated conductor connected to each of said contact points and pins whereby an electric warning circuit is completed when a non-labeled metallic can rolls over said contact pins or a loose label on a can blocks the upper end of said J-shaped tube causing a vacuum to be created therein which tends to straighten said tube whereby said first and second contact points engage one another to complete said electric circuit.

9. A loosely labeled and non-labeled can detecting and rejecting device which includes: means for guiding a plurality of cans along a predetermined path; electrical means for detecting a non-labeled can; a member having a bore formed therein; means to continuously draw a stream of air through said bore; a deformable member in communication with said bore; means for completing an electric circuit upon said deformable member being deformed by the loose label of a can momentarily obstructing the entrance to said bore to stop the flow of said air and create a vacuum in said bore; an electrically controlled gate operatively associated with said guide means, with said gate being actuated by an electric signal from said non-labeled detecting means or the completion of an electric circuit by said loose labeled detector to assume the open position to permit the detected cans to pass therethrough.

10. A loosely labeled and non-labeled can detecting and rejecting device which includes: means for guiding a plurality of cans along a predetermined path without interruption; electrical means for detecting a non-labeled can; a member having a bore formed therein; means to draw a stream of air continuously through said bore; a deformable member in communication with said bore; means for completing an electric circuit upon said deformable member being deformed by the loose label of a can momentarily obstructing the entrance to said bore to stop the flow of said air and create a vacuum in said bore; and an electrically operated movable member, with said member when actuated by electric signals from said detecting means being brought in contact with the can causing said signal to be given, and deflecting said can from said guide means.

11. A loosely labeled can detecting and rejecting device which includes: supporting means for guiding a plurality of cans along a predetermined path; a gate operatively associated with said guide means, with said gate being actuated by an electric signal to assume the open position to permit a loosely labeled can to pass therethrough; electric switch means positioned above said guide means, with said switch means when actuated by a loose label to electrically signal the presence thereof to said gate; and an air jet situated below said switch with said jet adapted to direct a stream of air on cans rolling along said guide means whereby loose labels are blown upwardly to actuate said switch means.

12. A loosely labeled and non-labeled can detecting and rejecting device which includes: guide means adapted to support a plurality of rolling cans; a gate operatively associated with said guide means and forming a portion of the path over which said cans roll, said gate being adapted to open to permit a loosely labeled or non-labeled can to pass therethrough; two laterally spaced movable can supporting members forming a portion of said gate; spring means to return said members to a can supporting position during and after a can has passed through said gate; electrical switching means situated adjacent to said guide means and ahead of said gate that is responsive to either loosely labeled or non-labeled cans, with said switching means completing an electric circuit to open said gate when contacted by a loosely labeled or non-labeled can; and an electrical switch positioned adjacent to said guide means and ahead of said switching means that is adapted to close said gate by breaking said circuit established by said switching means when said switch is actuated by the can following the loosely labeled or non-labeled can actuating said switching means.

GEORGE J. PALMER, Jr.

REFERENCES CITED

The following references are of record in the file of this patent:

UNITED STATES PATENTS

| Number | Name | Date |
| --- | --- | --- |
| 1,510,616 | Wild | Oct. 7, 1924 |
| 1,983,388 | Moore | Dec. 4, 1934 |
| 1,987,244 | Moore | Jan. 8, 1935 |
| 2,270,428 | Flint | Jan. 20, 1942 |
| 2,312,357 | Odquist | Mar. 2, 1943 |
| 2,318,355 | Bailey | May 4, 1943 |